United States Patent
Kitagawa et al.

(10) Patent No.: US 10,531,466 B2
(45) Date of Patent: Jan. 7, 2020

(54) COMMUNICATION APPARATUS, CONTROL METHOD, AND COMPUTER-READABLE STORAGE MEDIUM

(71) Applicant: KDDI CORPORATION, Tokyo (JP)

(72) Inventors: Kouichiro Kitagawa, Fujimino (JP); Noriyuki Hashimoto, Fujimino (JP); Yasuhiro Suegara, Fujimino (JP)

(73) Assignee: KDDI CORPORATION, Tokyo (JP)

(*) Notice: Subject to any disclaimer, the term of this patent is extended or adjusted under 35 U.S.C. 154(b) by 0 days.

(21) Appl. No.: 15/809,771

(22) Filed: Nov. 10, 2017

(65) Prior Publication Data

US 2018/0098326 A1    Apr. 5, 2018

Related U.S. Application Data

(63) Continuation of application No. PCT/JP2016/063814, filed on May 10, 2016.

(30) Foreign Application Priority Data

May 14, 2015   (JP) ................... 2015-099499

(51) Int. Cl.
*H04W 72/04* (2009.01)
*H04L 5/00* (2006.01)

(52) U.S. Cl.
CPC ....... *H04W 72/0473* (2013.01); *H04L 5/0055* (2013.01); *H04W 72/042* (2013.01); *H04W 72/0413* (2013.01)

(58) Field of Classification Search
CPC ......... H04L 5/0055; H04L 1/189; H04L 1/16; H04W 4/70; H04W 72/0473
See application file for complete search history.

(56) References Cited

U.S. PATENT DOCUMENTS

| 2014/0098761 A1 | 4/2014 | Lee et al. |
| 2015/0016312 A1 | 1/2015 | Li et al. |
| 2015/0117233 A1 | 4/2015 | Wong et al. |

FOREIGN PATENT DOCUMENTS

| CN | 104519591 A | 4/2015 |
| JP | 2014-220662 A | 11/2014 |

(Continued)

OTHER PUBLICATIONS

International Search Report dated Aug. 2, 2016, issued in corresponding International Patent Application No. PCT/JP2016/063814 and English translation. (3 pages).

(Continued)

*Primary Examiner* — Gbemileke J Onamuti
(74) *Attorney, Agent, or Firm* — Fitch, Even, Tabin & Flannery LLP (57) ABSTRACT

A communication apparatus that communicates with another communication apparatus detects a signal from the other communication apparatus, specifies an amount of a resource used to communicate a predetermined amount of data from the other communication apparatus to the communication apparatus, and transmits, to the other communication apparatus, one predetermined signal corresponding to the specified amount of the resource from a plurality of predetermined signals that are known in the communication apparatus and the other communication apparatus and respectively correspond to different amounts of a resource including at least one of a frequency and time used to communicate the predetermined amount of data.

14 Claims, 8 Drawing Sheets

CORRESPONDING RELATIONSHIP
BETWEEN REPETITION COUNT AND PREAMBLE

| | | PREAMBLE ID | | | |
|---|---|---|---|---|---|
| | | FIRST TRANS-MISSION | FIRST RETRANS-MISSION | SECOND RETRANS-MISSION | THIRD RETRANS-MISSION |
| REPETITIVE TRANS-MISSION COUNT (RESOURCE AMOUNT) | 1 | AA | AB | AC | AD |
| | 3 | BA | BB | BC | BD |
| | 5 | CA | CB | CC | CD |
| | ⋮ | ⋮ | ⋮ | ⋮ | ⋮ |

(56) References Cited

FOREIGN PATENT DOCUMENTS

WO        2014/181646 A1    11/2014
WO        2015/045959 A1    4/2015

OTHER PUBLICATIONS

MediaTek Inc., Discussion on PUCCH functionality for Rel-13 MTC; 3GPP TSG-RAN WGl Meeting; #80BIS RI-152114; Apr. 24, 2015 (2 pages).

3GPP TR36.888 V12.0.0; Jun. 2013 (55 pages).

Intel Corporation; Coverage enhancement for PRACH for MTC; 3GPP TSG RAN WG1 Meeting; #80bis R1-151435; Apr. 24, 2015 (5 pages).

NTT DOCOMO; Views on multiple repetition levels for PDSCH/PUSCH; 3GPP TSG RAN WG1 Meeting; #80bis R1-152052; Apr. 24, 2015 (3 pages).

U.S. Appl. No. 15/809,686, filed Nov. 10, 2017.

Intel Corporation: "Discussion on PRACH Coverage Enhancement for Low Cost MTC", 3GPP TSG RAN WG1 Meeting #74; pp. 1-7, Aug. 10, 2013.

Alcatel-Lucent, Alcatel-Lucent Shanghai Bell: "Coverage enhancement techniques for PRACH", 3GPP TSG-RAN WG1 Meeting #74bis; pp. 1-3, Oct. 7-11, 2013.

Extended European search report dated Feb. 19, 2018 concerning the corresponding European Patent Application No. 16792675.7, pp. 1-11.

CORRESPONDING RELATIONSHIP
BETWEEN REPETITION COUNT AND PREAMBLE

| REPETITIVE TRANSMISSION COUNT (RESOURCE AMOUNT) | PREAMBLE ID |
|---|---|
| 1 | A |
| 3 | B |
| 5 | C |
| ⋮ | ⋮ |

CORRESPONDING RELATIONSHIP BETWEEN REPETITION COUNT AND PREAMBLE

| | | PREAMBLE ID | | | |
|---|---|---|---|---|---|
| | | FIRST TRANS-MISSION | FIRST RETRANS-MISSION | SECOND RETRANS-MISSION | THIRD RETRANS-MISSION |
| REPETITIVE TRANS-MISSION COUNT (RESOURCE AMOUNT) | 1 | AA | AB | AC | AD |
| | 3 | BA | BB | BC | BD |
| | 5 | CA | CB | CC | CD |
| | ⋮ | ⋮ | ⋮ | ⋮ | ⋮ |

| | | REPETITIVE RECEPTION COUNT | | | |
|---|---|---|---|---|---|
| | | 1 | 2 | 3 | ... |
| REPETITIVE TRANSMISSION COUNT (RESOURCE AMOUNT) | 1 | AX | AY | AZ | ... |
| | 3 | BX | BY | BZ | ... |
| | 5 | CX | CY | CZ | ... |
| | ⋮ | ⋮ | ⋮ | ⋮ | ⋮ |

FIG. 10B

| | | FIRST TRANSMISSION | | | | FIRST RETRANSMISSION | | | | ... |
|---|---|---|---|---|---|---|---|---|---|---|
| | | REPETITIVE RECEPTION COUNT | | | | REPETITIVE RECEPTION COUNT | | | | ... |
| | | 1 | 2 | 3 | ... | 1 | 2 | 3 | ... | ... |
| REPETITIVE TRANSMISSION COUNT (RESOURCE AMOUNT) | 1 | AAX | AAY | AAZ | ... | ABX | ABY | ABZ | ... | ... |
| | 3 | BAX | BAY | BAZ | ... | BBX | BBY | BBZ | ... | ... |
| | 5 | CAX | CAY | CAZ | ... | CBX | CBY | CBZ | ... | ... |
| | ⋮ | ⋮ | ⋮ | ⋮ | ⋮ | ⋮ | ⋮ | ⋮ | ⋮ | ⋮ |

COMMUNICATION APPARATUS, CONTROL METHOD, AND COMPUTER-READABLE STORAGE MEDIUM

This application is a continuation of International Patent Application No. PCT/JP2016/063814 filed on May 10, 2016, and claims priority to Japanese Patent Application No. 2015-099499 filed on May 14, 2015, the entire content of both of which is incorporated herein by reference.

TECHNICAL FIELD

The present invention relates to a communication apparatus, a control method, and a computer-readable storage medium and, more particularly, to a coverage extension technique in wireless communication.

BACKGROUND ART

In recent years, it is examined to cope with an inexpensive low-power terminal configured to perform only communication of a small amount of data in a cellular network (NPL 1). Such a terminal is considered to be used to, for example, acquire some observation data concerning a natural phenomenon or monitor the state of some device. Since such a terminal does not always exist in a range a human normally enters, the coverage of a normal cellular network is sometimes unable to cope with the terminal.

In NPL 1, extending the coverage to prepare for such a case is examined. For example, the coverage can be extended by causing a transmitter to repetitively transmit the same signal. In this case, even in a case where a receiver could not succeed in receiving the signal transmitted only once (that is, even if the contents of the signal cannot be acquired by demodulation or the like), it can succeed in the reception because of a gain by the repetition. Hence, a terminal that exists in a range where communication is originally impossible can communicate with a base station.

CITATION LIST

Non Patent Literature

NPL 1: 3GPP TR36.888 V12.0.0, 2013 June

SUMMARY OF INVENTION

Technical Problem

When extending the coverage, some resource is redundantly used. That is, for example, when repetitively transmitting a signal, at least one resource out of the frequency and time is used as many times as the repetitive transmission count to transmit one data as compared to one transmission. If the communication apparatus repetitively transmits data too many times to reliably communicate with another apparatus, the resources are wasted. On the other hand, if the count is insufficient, communication is eventually impossible. Hence, in such a coverage extension technique, it is important to specify a resource amount that prevents unnecessary waste of the resource and enables communication.

Solution to Problem

According to an aspect of the present invention, there is provided a communication apparatus that communicates with another communication apparatus, comprising a specifying unit configured to detect a signal from the other communication apparatus and specify an amount of a resource used to communicate a predetermined amount of data from the other communication apparatus to the communication apparatus, and a transmission unit configured to transmit, to the other communication apparatus, one predetermined signal corresponding to the amount of the resource specified by the specifying unit from a plurality of predetermined signals that are known in the communication apparatus and the other communication apparatus and respectively correspond to different amounts of a resource including at least one of a frequency and time used to communicate the predetermined amount of data.

According to another aspect of the present invention, there is provided a communication apparatus that communicates with another communication apparatus, comprising a transmission unit configured to transmit, to the other communication apparatus, information that designates a plurality of predetermined signals that are known in the communication apparatus and the other communication apparatus and respectively correspond to different amounts of a resource including at least one of a frequency and time used to communicate a predetermined amount of data, a reception unit configured to receive one of the plurality of predetermined signals from the other communication apparatus, and a specifying unit configured to specify, based on the signal received by the reception unit, an amount of the resource to be used to communicate the data from the communication apparatus to the other communication apparatus.

Advantageous Effects of Invention

According to the present invention, it is possible to specify the resource amount that prevents unnecessary waste of the resource and enables communication in the coverage extension technique.

Other features and advantages of the present invention will be apparent from the following descriptions taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

DESCRIPTION OF EMBODIMENTS

An embodiment of the present invention will now be described in detail with reference to the accompanying drawings.

(Arrangement of Wireless Communication System)

Figure 1:
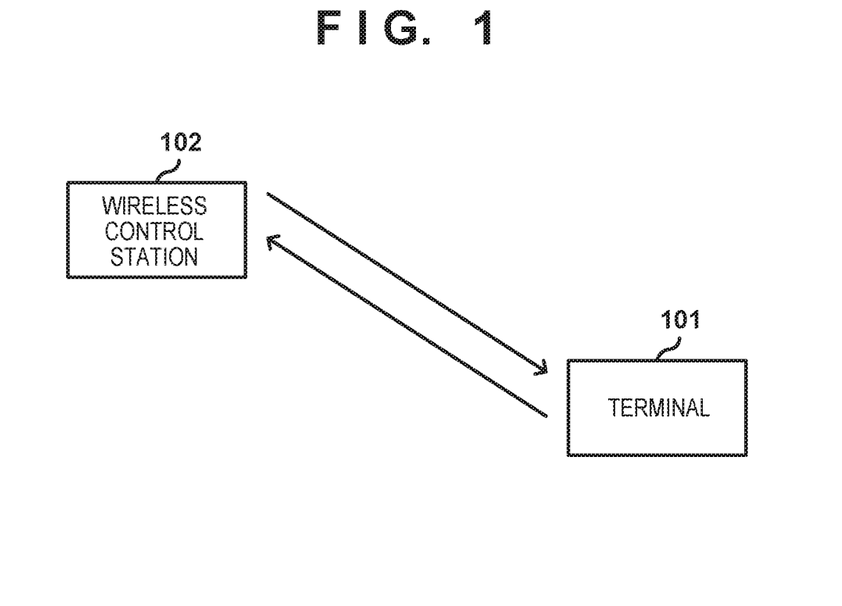
FIG. 1 is a block diagram showing an example of the arrangement of a wireless communication system.

FIG. 1 shows an example of the arrangement of a wireless communication system according to this embodiment. The wireless communication system includes, for example, a terminal 101 and a wireless control station 102 each of which operates a wireless communication apparatus. Note that a system including one terminal 101 and one wireless control station 102 is exemplarily shown. However, there can exist a plurality of communication apparatuses. The wireless control station 102 is, for example, a base station apparatus. In addition, the wireless communication system is, for example, a cellular communication system such as a long term evolution (LTE) system. However, it may be cellular communication systems of later generations or a wireless communication system such as a wireless LAN. That is, the following technique can be applied to a case in which some technique of extending the communication range between two communication apparatuses is used, and the target is not necessarily limited to a specific system such as a cellular communication system.

In this wireless communication system, the wireless control station 102 or the terminal 101 repetitively transmits the same data a plurality of times, and the receiving-side apparatus can receive the data by a gain obtained by transmitting the same data a plurality of times. Note that "transmitting the same data a plurality of times" here does not always mean "transmitting the same signal a plurality of times". That is, the same data may be transmitted a plurality of times by the same signal, or may be transmitted a plurality of times by a plurality of different signals formed by, for example, performing different encoding methods for the same data. That is, the "same data" means data of the transmission target, and the signal itself used to transmit the data or contents (for example, a bit string after encoding/before decoding) transmitted by the signal may change in each transmission. Here, as described above, if the transmitting-side apparatus transmits the same data many times more than necessary, at least one resource (for example, a resource block) out of the frequency and time is wasted. In addition, for example, if the terminal transmits a signal too many times, power consumption increases, and the requirement of low power consumption cannot be met. On the other hand, if the data transmission repetition count is too small, communication cannot be performed. At this time, the resource used for the communication attempt is also wasted.

For this reason, a method for specifying an appropriate amount of a resource to be used in the communication between the wireless control station 102 and the terminal 101 is introduced to the wireless communication system. Additionally, at this time, the wireless control station 102 that controls the communication is allowed to know the information. Note that the "appropriate amount of a resource" here is a resource amount that enables communication and prevents excessive waste of the resource "concerning communication of a predetermined amount of data". That is, generally, if the amount of data to be transmitted is large, the resource amount increases, as a matter of course. However, the resource amount is specified as an amount independent of such a data amount. The "predetermined amount" may be, for example, the amount of data transmitted in periodical communication between the terminal 101 and the wireless control station 102 or may be, for example, a data amount corresponding to one resource block in LTE.

The resource amount is defined as a minimum repetitive transmission count necessary for the wireless control station 102 to succeed in receiving the preamble of a random access channel transmitted by the terminal 101 (that is, succeed in specifying what kind of preamble is transmitted). The resource amount may be defined as a combination of transmission power and the minimum repetitive transmission count necessary for the wireless control station 102 to succeed in receiving the preamble of a random access channel transmitted by the terminal 101. Note that the resource amount may be defined by a value other than the repetitive transmission count. For example, the resource amount may be defined by a spreading factor when spreading transmission of one data. In this case, the transmitting-side apparatus can, for example, spread data before transmission and transmit the spread data using a plurality of resource blocks. As the spreading factor becomes high, the receiving-side apparatus can obtain a larger gain and receive a signal transmitted from a remote site.

In this embodiment, the amount of a resource to be used in data communication is specified by detecting, by the receiving-side apparatus, the preamble of a random access channel transmitted by the terminal 101 or a notification signal transmitted by the wireless control station 102. Note that these signals are merely examples, and a signal other than the preamble of a random access channel or the notification signal may be used to specify the resource amount. For example, some channel defined by 3GPP (Third Generation Partnership Project) can be used. In addition, the terminal 101 detects the notification signal transmitted by the wireless control station 102, specifies the amount of a resource to be used in a downlink, and informs the wireless control station 102 of the result. In this informing operation, the terminal 101 can use the preamble of a random access channel.

Examples of the arrangement of the terminal 101 and the wireless control station 102 and the procedures of processing to be executed will be described below with reference to the drawings from FIG. 2.

(Hardware Arrangement of Wireless Control Station and Terminal)

Figure 2:
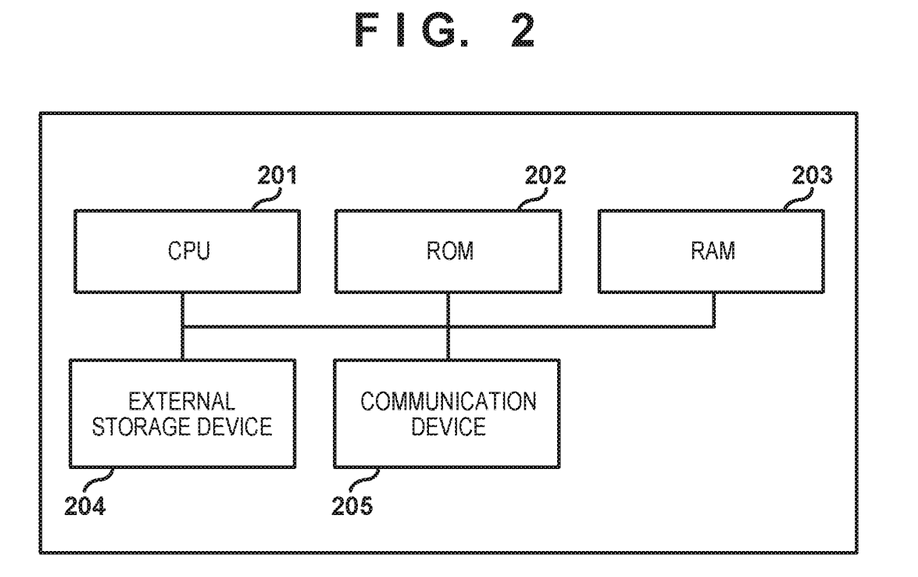
FIG. 2 is a block diagram showing an example of the hardware arrangement of a wireless control station and a terminal.

FIG. 2 is a block diagram showing an example of the hardware arrangement of the wireless control station 102 and the terminal 101. In an example, each of the wireless control station 102 and the terminal 101 has the hardware arrangement as shown in FIG. 2, and includes, for example, a CPU 201, a ROM 202, a RAM 203, an external storage device 204, and a communication device 205. In each of the wireless control station 102 and the terminal 101, for example, the CPU 201 executes a program recorded in one of the ROM 202, the RAM 203, and the external storage device 204 and configured to implement each function of the wireless control station 102 or the terminal 101. Each of the wireless control station 102 and the terminal 101, for example, controls the communication device 205 by the CPU 201 and performs communication between the wireless control station 102 and another wireless control station or between the wireless control station 102 and the terminal 101.

Note that in FIG. 2, each of the wireless control station 102 and the terminal 101 includes one communication device 205. However, for example, the wireless control station 102 may include a communication device for communication between wireless control stations and a communication device for communication with the terminal 101. In addition, the terminal 101 may include, for example, a plurality of communication devices corresponding to a plurality of frequency bands, respectively. Note that for direct communication between terminals, the terminal 101 may include, for example, a communication device used to receive an uplink signal or may include a communication device used to transmit a downlink signal.

Note that each of the wireless control station 102 and the terminal 101 may include dedicated hardware for executing each function, or may execute some functions by hardware and the remaining functions by a computer that operates a program. Each of the wireless control station 102 and the terminal 101 may execute all functions by a computer and a program.

(Functional Arrangement of Terminal)

Figure 3:
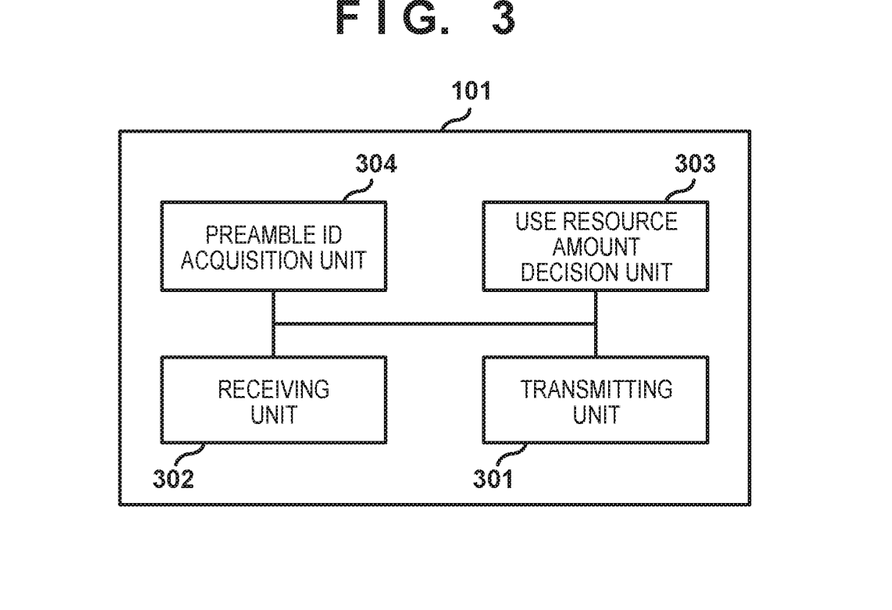
FIG. 3 is a block diagram showing an example of the functional arrangement of the terminal.

FIG. 3 is a block diagram showing an example of the functional arrangement of the terminal 101. The terminal 101 includes, as the functional arrangement, for example, a transmitting unit 301, a receiving unit 302, a use resource amount decision unit 303, and a preamble ID acquisition unit 304.

The transmitting unit 301 is a functional unit configured to, for example, transmit a signal to the wireless control station 102 by transmitting the same data signal repetitively one or more times. Note that if the terminal 101 exists in the coverage area of the wireless control station 102, the transmitting unit 301 normally transmits a data signal once. If the terminal 101 does not exist in the coverage area of the wireless control station 102, and coverage extension is needed, the transmitting unit 301 transmits a data signal a plurality of times. Note that the transmitting unit 301 transmits, to the wireless control station 102, the preamble of a predetermined random access channel corresponding to a resource amount that is decided or specified by the use resource amount decision unit 303 and should be used in uplink or downlink communication. A detailed method will be described later.

The receiving unit 302 is a functional unit configured to, for example, receive a data signal transmitted from the wireless control station 102 one or more times and acquire the contents of the data. Note that if the terminal 101 exists in the coverage area of the wireless control station 102, the receiving unit 302 normally receives a data signal only once, thereby acquiring data included in the signal. On the other hand, if the terminal 101 does not exist in the coverage area of the wireless control station 102, and coverage extension is needed, the receiving unit 302 receives a data signal a plurality of times, thereby acquiring data.

The use resource amount decision unit 303 decides the amount of a resource to be used by the terminal 101 to transmit a signal, and also specifies the amount of a resource needed to acquire data from a signal transmitted by the wireless control station 102.

The use resource amount decision unit 303 can independently decide the amount of a resource to be used by the terminal 101 to transmit a signal. For example, if the resource amount is defined as a repetitive signal transmission count, the use resource amount decision unit 303 initially decides to transmit each data signal only once. After that, if it is determined that the wireless control station 102 has failed in receiving the data signal because, for example, no ACK is transmitted from the wireless control station 102 after the signal transmission, the use resource amount decision unit 303 increases the repetitive transmission count. The use resource amount decision unit 303 thus improves the data signal reception success probability in the wireless control station 102. That is, the use resource amount decision unit 303 attempts to obtain the effect of extending the coverage of the wireless control station 102 by increasing the data signal transmission count. In general, the probability that the wireless control station 102 can receive the data signal can gradually be improved by gradually increasing the amount of a resource to be used. Note that at this time, if a minimum signal transmission count is obtained in advance by external input, the use resource amount decision unit 303 may perform repetitive transmission as many times as this signal transmission count independently of whether ACK is transmitted from the wireless control station 102 or not. That is, the initial repetitive signal transmission count need not always be one, and the signal may be repetitively transmitted a plurality of times from the beginning (and always in some cases).

Note that the repetitive signal transmission count can be associated with a gain (dB) obtained by the repetitive transmission. Here, the value of the gain to be obtained may be a discrete value, for example, a value at an interval of 5 dB. In this case, the use resource amount decision unit 303 can initially attempt to transmit data once to obtain a gain of 0 dB. In a case of a failure, the use resource amount decision unit 303 can attempt to transmit data a number of times to obtain a gain of 5 dB and after that, can attempt to transmit data a number of times to obtain a gain of 10 dB.

Note that a case in which repetitive transmission is used as a method of obtaining a gain will be described here. However, a gain to be obtained and a transmission method may be associated even in a case in which a method other than repetitive transmission is used. In each explanation to be made later as well, a method other than repetitive transmission can be used as a method of obtaining a gain.

In addition, for a signal repetitively transmitted by the wireless control station 102, the use resource amount decision unit 303 can specify a reception count at which the signal has been successively received (that is, data associated with the signal could be acquired). The wireless control station 102, for example, repetitively transmits a notification signal including a system information block (SIB) or the like. The terminal 101 receives the notification signal one or more times, thereby acquiring the contents of the notification signal. In this case, the use resource amount decision unit 303 specifies a reception count at which the contents of the notification signal could be acquired.

Figure 5A:
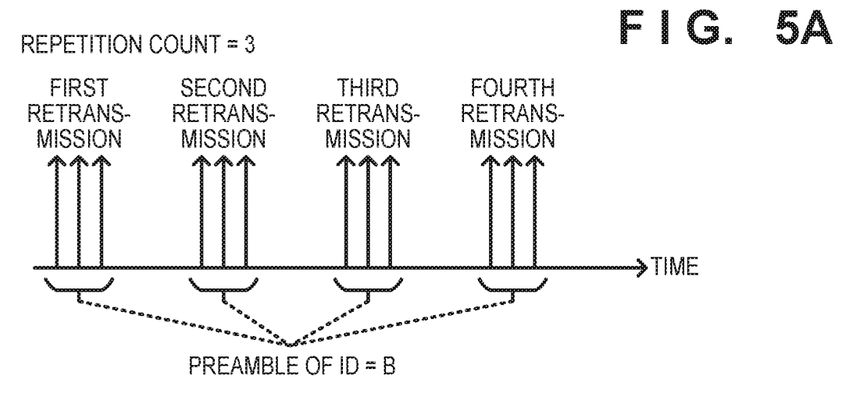
FIG. 5A is a schematic view showing the corresponding relationship between a repetitive transmission count and a preamble ID to be used in a case in which a gain is obtained by repetitive transmission.
Figure 5B:
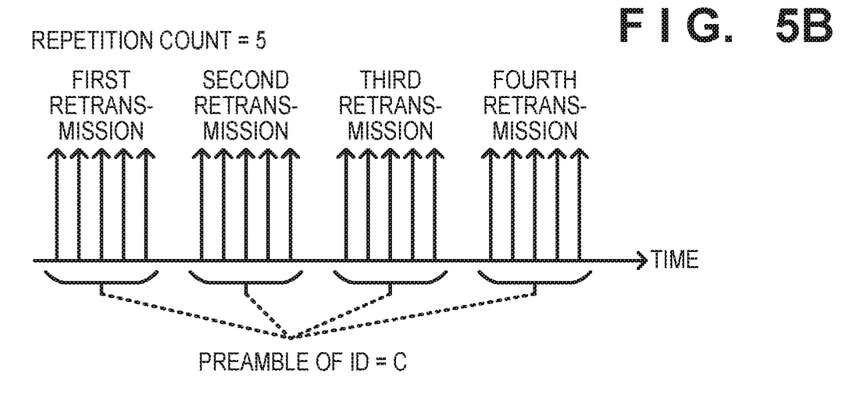
FIG. 5B is a schematic view showing the corresponding relationship between a repetitive transmission count and a preamble ID to be used in a case in which a gain is obtained by repetitive transmission.
Figure 5C:
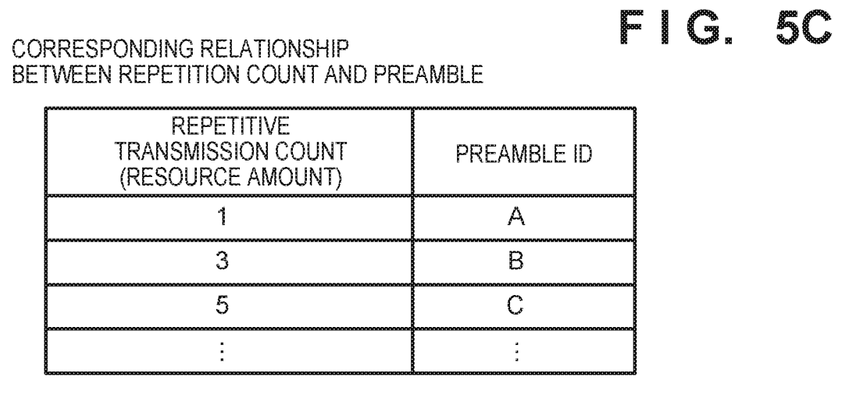
FIG. 5C is a schematic view showing the corresponding relationship between a repetitive transmission count and a preamble ID to be used in a case in which a gain is obtained by repetitive transmission.

The preamble ID acquisition unit 304, for example, acquires, from the wireless control station 102, information (preamble ID) for specifying a plurality of preamble patterns of a random access channel, each corresponding to a use resource amount. FIG. 5C shows an example of information acquired here. In the case of FIG. 5C, an ID that changes for each repetitive transmission count is assigned, and for example, a preamble ID: A is assigned to a case in which repetitive transmission is not performed, a preamble ID: B is assigned to a repetitive transmission count of 3, and a preamble ID: C is assigned to a repetitive transmission count of 5. Note that FIG. 5C merely shows an example. The preamble IDs need not always be assigned to an odd number of repetitive transmission counts such as 1, 3, and 5. The preamble IDs can be assigned to various repetition counts.

The preamble ID acquisition unit 304 may acquire the information of the corresponding relationship between a use resource amount and a preamble ID by receiving a notification signal transmitted by the wireless control station 102 or by another signal. If the information of the corresponding relationship between the use resource amount and the preamble ID does not change over time, the information may be informed from the wireless control station 102 to the terminal 101 only once. The information of the corresponding relationship between the use resource amount and the preamble ID may change over time. The terminal 101 may monitor a signal transmitted from the wireless control station 102, and if the signal changes, the terminal 101 may update the internally stored corresponding relationship.

Note that the preamble ID may be designated by an individual preamble ID or may be designated by a group ID that designates a group of a plurality of preamble IDs. For example, in the case of FIG. 5C, the preamble IDs A, B, and C that are preamble IDs for the repetitive transmission counts of 1, 3, and 5 can be informed. Alternatively, if a group including the preamble IDs A, B, and C for the repetitive transmission counts of 1, 3, and 5 is defined in advance, the group ID may be informed. In the informing operation of the relationship between the repetitive transmission count (gain) and the preamble ID, for example, if the repetitive transmission count is specified by a field in the informed contents, the information of the repetitive transmission count need not explicitly be informed. For example, if W bits from the start of informed contents correspond to the preamble ID for the repetitive transmission count of 1, the preamble ID acquisition unit 304 can acquire the preamble ID for the repetitive transmission count of 1 only by reading the W bits from the start of the received informed contents. If bits from the (W+1)th bit to the 2Wth bit of informed contents correspond to the preamble ID for the repetitive transmission count of 3, the preamble ID acquisition unit 304 can acquire the preamble ID for the repetitive transmission count of 3 by reading the bits from the (W+1)th bit to the 2Wth bit of the informed contents. According to this, since the information about the repetitive transmission count need not be transmitted, the amount of information associated with the information can be decreased. Note that even if the repetitive transmission count is another value associated with the gain, the same informed contents can be formed.

The transmitting unit 301 specifies one of preambles corresponding to the plurality of preamble IDs acquired by the preamble ID acquisition unit 304 in accordance with the resource amount decided or specified by the use resource amount decision unit 303, and transmits the preamble. For example, if the corresponding relationship shown in FIG. 5C is used, and the use resource amount decision unit 303 decides the repetitive transmission count of transmission to the wireless control station 102 as 3, the transmitting unit 301 transmits the preamble corresponding to the preamble ID: B three times as one unit. In addition, if the use resource amount decision unit 303 decides the repetitive transmission count of transmission to the wireless control station 102 as 5, the transmitting unit 301 transmits the preamble corresponding to the preamble ID: C five times as one unit. Here, the preamble of the random access channel is normally retransmitted while increasing the transmission power until the preamble is received by the receiving-side apparatus. However, the situation in which repetitive transmission is required is a situation in which the level of the signal arriving at the receiving-side apparatus only once is so low that the signal cannot be demodulated. Hence, the transmitting unit 301 can perform the retransmission a plurality of times by the same power using, as one unit, the repetitive transmission count of the same preamble decided by the use resource amount decision unit 303, as shown in FIGS. 5A and 5B. That is, if the use resource amount decision unit 303 decides the repetitive transmission count as 3, the transmitting unit 301 transmits the preamble corresponding to the preamble ID: B repetitively three times even in retransmission. In this case, the transmitting unit 301 performs the first transmission and the first retransmission, thereby transmitting the same signal six times in total.

Figure 6A:
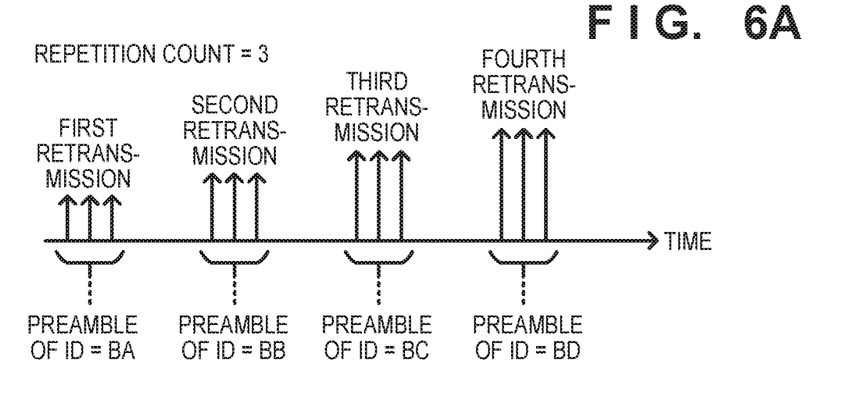
FIG. 6A is a schematic view showing the corresponding relationship between a repetitive transmission count, a retransmission count, and a preamble ID to be used in a case in which transmission power is changed at the time of retransmission in repetitive transmission.
Figure 6B:
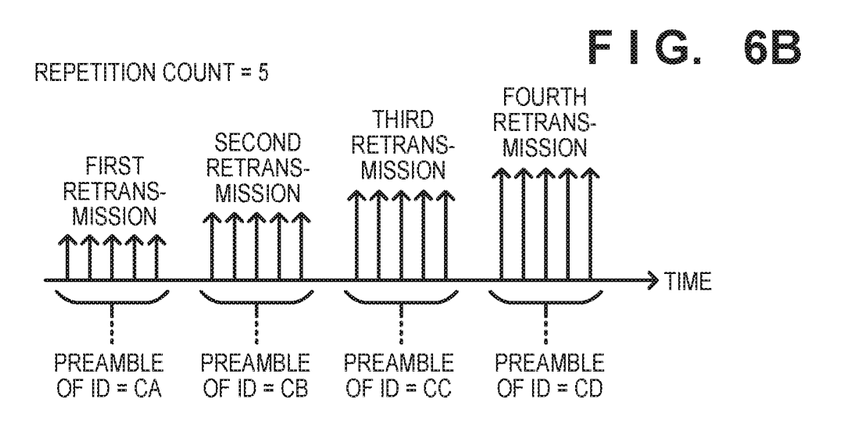
FIG. 6B is a schematic view showing the corresponding relationship between a repetitive transmission count, a retransmission count, and a preamble ID to be used in a case in which transmission power is changed at the time of retransmission in repetitive transmission.
Figure 6C:
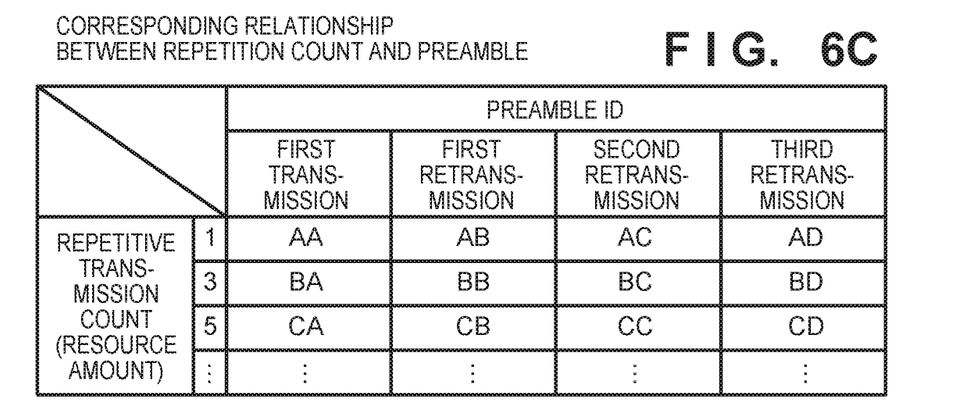
FIG. 6C is a schematic view showing the corresponding relationship between a repetitive transmission count, a retransmission count, and a preamble ID to be used in a case in which transmission power is changed at the time of retransmission in repetitive transmission.

The transmitting unit 301 may perform the above-described retransmission while increasing the transmission power. At this time, the transmitting unit 301 may change the preamble to be transmitted in accordance with the retransmission count. For example, if the repetitive transmission count is 3, as shown in FIGS. 6A and 6C, the transmitting unit 301 transmits a preamble whose preamble ID is BA in the first transmission. In the first retransmission (that is, in the second transmission) in the case in which the repetitive transmission count is 3, the transmitting unit 301 transmits a preamble whose preamble ID is BB. Similarly, if the repetitive transmission count is 5, as shown in FIGS. 6B and 6C, the transmitting unit 301 transmits a preamble whose preamble ID is CA in the first transmission. In the first, second, and third retransmissions, the transmitting unit 301 transmits preambles whose preamble IDs are CB, CC, and CD, respectively, repetitively five times. Note that in this case, the preamble ID acquisition unit 304 acquires the information of the corresponding relationship between a repetitive transmission count and a retransmission count, to which a preamble ID that changes for each retransmission count, and the preamble ID.

Note that in FIGS. 5C and 6C, a preamble ID in a case in which the repetitive transmission count is 1 is specified. However, the preamble in the first transmission may be the same as the conventional preamble of a random access channel. In addition, only when the repetitive transmission count is 1, the transmitting unit 301 may transmit a preamble while increasing transmission power in the retransmission.

If the repetitive transmission count is a plural count, the transmitting unit 301 may transmit a preamble at the maximum transmission power in both the first transmission and the retransmission.

Note that the preamble ID may be defined not for a repetitive transmission count but for each obtained gain so that, for example, a preamble ID: D is set for a gain of 0 dB, a preamble ID: E is set for a gain of 5 dB, and a preamble ID: C is set for a gain of 10 dB. At this time, the transmitting unit 301 transmits a preamble using a signal transmission method corresponding to each gain. For example, when obtaining a gain of 5 dB, the transmitting unit 301 specifies a predetermined transmission count of a signal corresponding to the gain of 5 dB, and transmits a preamble with the preamble ID "E" repetitively as many times as the specified predetermined transmission count. Alternatively, when obtaining a gain of 5 dB, the transmitting unit 301 may specify a spreading factor corresponding to the gain of 5 dB, spread the preamble with the preamble ID "E" by the spreading factor, and transmit the preamble.

Upon successfully receiving the preamble, the wireless control station 102 can specify, in accordance with the preamble ID at that time, a resource amount (repetition count) to be used by the terminal 101 to transmit a signal to the wireless control station 102. At this time, the wireless control station 102 can inform the terminal 101 of the specified resource amount via, for example, a control signal. Note that the informing operation of the resource amount may be an informing operation by the preamble ID, that is, the informing operation of the specified preamble ID. Note that if the preambles of a plurality of preamble IDs are successfully received, the wireless control station 102 may select a minimum one of resource amounts corresponding to the preamble IDs. Accordingly, when the terminal 101 transmits a signal to the wireless control station 102, a resource that is necessary for success of reception and whose amount is not unnecessarily large can be used.

Even when informing the wireless control station 102 of a repetitive transmission count (gain) needed for signal transmission from the wireless control station 102 to the terminal 101, the transmitting unit 301 can perform the same preamble specifying and transmission as in the above-described method. That is, the use resource amount decision unit 303 specifies how many times the signal reception is needed until the signal transmitted from the wireless control station 102 is demodulated (data included in the signal is acquired). The transmitting unit 301 can specify one preamble in accordance with the count and transmit it. For example, if the reception count needed for demodulation of the signal is 1, the transmitting unit 301 transmits a preamble having a preamble ID "X". If the reception count needed for demodulation of the signal is 2, the transmitting unit 301 can transmit a preamble having a preamble ID "Y". Accordingly, depending on which preamble is received, the wireless control station 102 can know the degree of coverage extension for which a gain is required to be obtained when transmitting a signal to the terminal 101. Hence, the wireless control station 102 transmits a signal repetitively as many times as the minimum count for successful reception by the terminal 101, thereby preventing waste of a resource while using a resource amount to such a degree that enables communication.

(Arrangement of Wireless Control Station)

Figure 4:
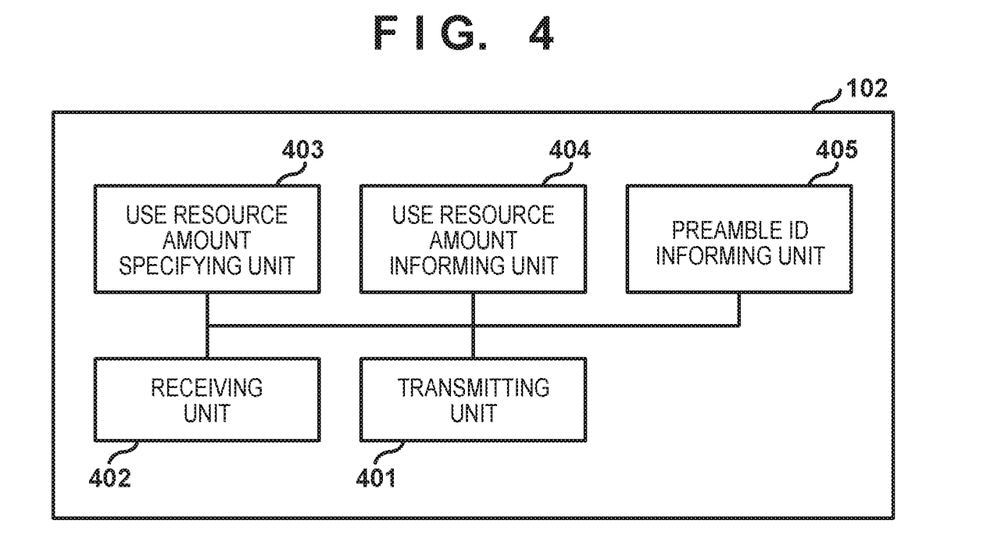
FIG. 4 is a block diagram showing an example of the functional arrangement of the wireless control station.

FIG. 4 is a block diagram showing an example of the functional arrangement of the wireless control station 102. The wireless control station 102 includes, as the functional arrangement, for example, a transmitting unit 401, a receiving unit 402, a use resource amount specifying unit 403, a use resource amount informing unit 404, and a preamble ID informing unit 405.

The transmitting unit 401 is a functional unit configured to, for example, transmit the same data signal repetitively one or more times, thereby transmitting the signal to the terminal 101. Note that if the terminal 101 exists in the coverage area of the wireless control station 102, the transmitting unit 401 normally transmits a data signal once. If the terminal 101 does not exist in the coverage area of the wireless control station 102, and coverage extension is needed, the transmitting unit 401 transmits a data signal a plurality of times.

The receiving unit 402 is a functional unit configured to, for example, receive a data signal or a preamble transmitted from the terminal 101 one or more times and acquire the contents of the data or a preamble ID. Note that if the terminal 101 exists in the coverage area of the wireless control station 102, the receiving unit 402 normally receives a data signal only once, thereby acquiring data included in the signal. On the other hand, if the terminal 101 does not exist in the coverage area of the wireless control station 102, and coverage extension is needed, the receiving unit 402 receives a data signal a plurality of times, thereby acquiring data.

The use resource amount specifying unit 403 decides the amount of a resource to be used (repetitive transmission count) in accordance with to which preamble ID the preamble that the terminal 101 has transmitted in the above-described way corresponds. For example, in the example shown in FIGS. 5A to 5C, if the wireless control station 102 successfully receives a signal having a preamble ID "B", the use resource amount specifying unit 403 specifies that repetitive signal transmission should be performed three times in signal transmission from the terminal 101 to the wireless control station 102. Note that at this time, the wireless control station 102 specifies the number of times of preamble detection until successful reception of the preamble from the terminal, thereby obtaining a necessary repetitive transmission count. On the other hand, when the preamble specified based on the repetitive transmission count is used, the wireless control station 102 can specify a minimum necessary repetitive transmission count even if the wireless control station 102 cannot detect one or more of repetitively transmitted preambles. That is, assume that in a case in which the terminal 101 transmits a preamble repetitively, for example, three times, the wireless control station 102 detects the preamble two times and, as a result, can specify the preamble. In this case, if the preamble does not correspond to the repetitive transmission count, the wireless control station 102 determines that the repetitive transmission count is 2. On the other hand, if the repetitive transmission count is informed by a preamble ID, the repetitive transmission count can be determined as 3. Note that the use resource amount specifying unit 403, for example, specifies the gain to be obtained from the preamble ID and inputs it to the use resource amount informing unit 404.

Additionally, depending on to which preamble ID the preamble transmitted by the terminal 101 in the above-described way corresponds, the use resource amount specifying unit 403 can specify a resource amount to be used by the wireless control station 102 to transmit a signal to the terminal 101. Note that the use resource amount specifying unit 403 may, for example, specify the gain to be obtained from the preamble ID and issue an instruction to the transmitting unit 401 to use a communication method capable of obtaining the gain.

The use resource amount informing unit 404 informs the terminal 101, via the transmitting unit 401, of the resource amount specified by the use resource amount specifying unit 403 and needed by the terminal 101 to transmit a signal to the wireless control station 102. This informing operation can be done using, for example, the resource in an amount specified by the use resource amount specifying unit 403 and needed by the wireless control station 102 to transmit a signal to the terminal 101. The preamble ID informing unit 405 informs the terminal 101 of the preamble ID for each use resource amount via the transmitting unit 401. This information is the same as described in the explanation of the preamble ID acquisition unit 304 in the terminal 101, and a detailed description thereof will be omitted.

(Procedure of Processing)

Several examples of the procedure of resource amount specifying processing performed between the terminal 101 and the wireless control station 102 as described above will be described next.

Processing Example 1

In this processing example, the amount of a resource to be used in an uplink (a link to transmit a signal from the terminal 101 to the wireless control station 102) is specified. This processing will be described with reference to FIG. 7. In this processing example, first, the wireless control station 102 transmits an initial access parameter to the terminal 101 (step S701). Here, the initial access parameter can include, for example, information representing the corresponding relationship between the above-described repetitive transmission count (or the use resource amount or the gain to be obtained) and a preamble ID. The initial access parameter can also include at least one of a parameter concerning the initial transmission power for a preamble and a retransmission attempt count.

Figure 7:
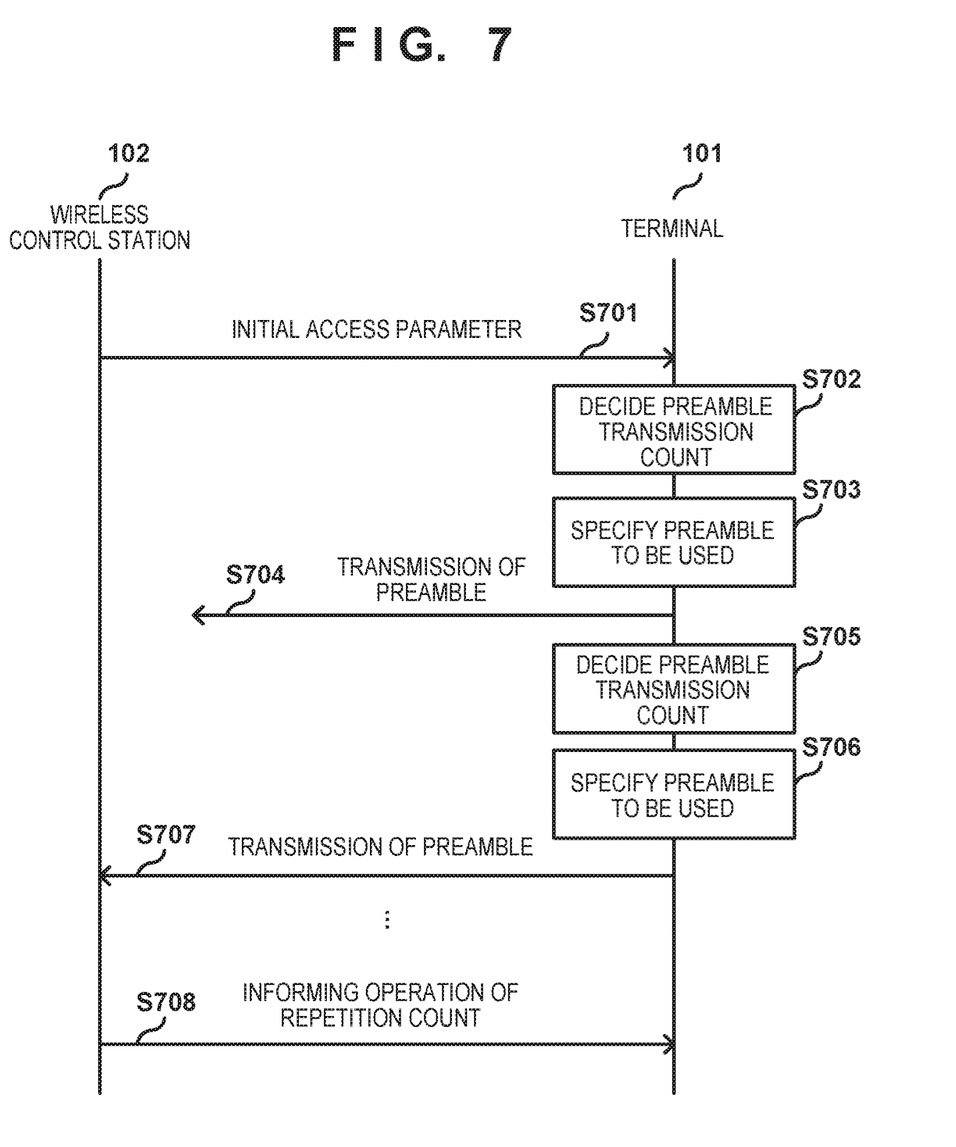
FIG. 7 is a sequence chart showing an example of the procedure of resource amount specifying processing in uplink communication.

Next, the terminal 101 independently decides the repetitive signal transmission count (step S702), specifies the preamble of a preamble ID corresponding to the count (step S703), and transmits the specified preamble repetitively as many times as the count decided in step S702 (step S704). First, the terminal 101 can, for example, attempt to transmit the preamble of a random access channel as ever without performing repetitive signal transmission. If the preamble is received by the wireless control station 102, the wireless control station 102 informs the terminal 101 that repetitive transmission is unnecessary (step S708). In this case, the terminal 101 does not perform the repetitive transmission even in subsequent communication.

On the other hand, if the wireless control station 102 cannot succeed in receiving the preamble without repetitive transmission, the terminal 101 increases the repetitive transmission count (step S705) and attempts to extend the coverage. The terminal 101 specifies the preamble to be used in accordance with the change in the repetitive transmission count (step S706), and transmits the specified preamble repetitively as many times as the count decided in step S705 (step S707).

Note that if the informed contents of step S708 are not received although the retransmission attempt count of the preamble reaches the value informed by the initial parameter in step S704, the terminal 101 can determine that the wireless control station 102 cannot succeed in receiving the preamble without repetitive transmission. Note that the retransmission of the preamble may be performed using, for example, predetermined power, as shown in FIGS. 5A and 5B, or may be performed while gradually increasing the power, as shown in FIGS. 6A and 6B. In addition, different preambles may be transmitted in accordance with the retransmission count for each repetitive transmission unit, as shown in FIG. 6C, or the same preamble may be transmitted independently of the retransmission count, as shown in FIG. 5C. Note that different preambles may be transmitted in accordance with the retransmission count for each repetitive transmission unit, as shown in FIG. 6C, while performing the retransmission using predetermined power, as shown in FIGS. 5A and 5B. Note that if different preambles are transmitted in accordance with the retransmission count, the preamble to be transmitted is specified in each retransmission. If any one of the preambles is successfully received, the wireless control station 102 specifies the repetitive transmission count (necessary gain) from the preamble ID of the preamble and informs the terminal 101 of it (step S708).

Note that the level of the necessary gain (coverage extension level) may be divided into, for example, a predetermined number of steps. In this case, the terminal 101 and the wireless control station 102 can perform the processing shown in FIG. 7 to determine which one of the predetermined number of steps the gain corresponds to. For example, if there exist four steps of 0 dB, 0 to 5 dB, 5 to 10 dB, and 10 to 20 dB as the levels of the necessary gain, the terminal 101 uses a signal transmission method capable of obtaining gains of 0 dB, 5 dB, 10 dB, and 20 dB in the levels, respectively. Note that as the signal transmission method, any method capable of obtaining a gain such as a method using adjustment of the repetitive transmission count or a method using adjustment of the spreading factor can be used. In this case, the wireless control station 102 informs the terminal 101 of preamble IDs corresponding to the four steps. The terminal 101 transmits, for example, preambles corresponding to the level of the smaller gain to the level of the larger gain sequentially to the wireless control station 102. The wireless control station 102 can thus grasp the necessary degree of coverage extension.

Processing Example 2

In this processing example, the amount of a resource to be used in a downlink (a link to transmit a signal from the wireless control station 102 to the terminal 101) is specified. This processing will be described with reference to FIG. 8. In this processing example, first, the wireless control station 102 periodically transmits a notification signal (step S801). At this time, the terminal 101 determines how many times the reception is needed until the notification signal is successfully received, that is, how many times the notification signal is detected until it is successfully demodulated. Note that the notification signal is merely an example, and any signal that is transmitted a plurality of times is usable.

Figure 8:
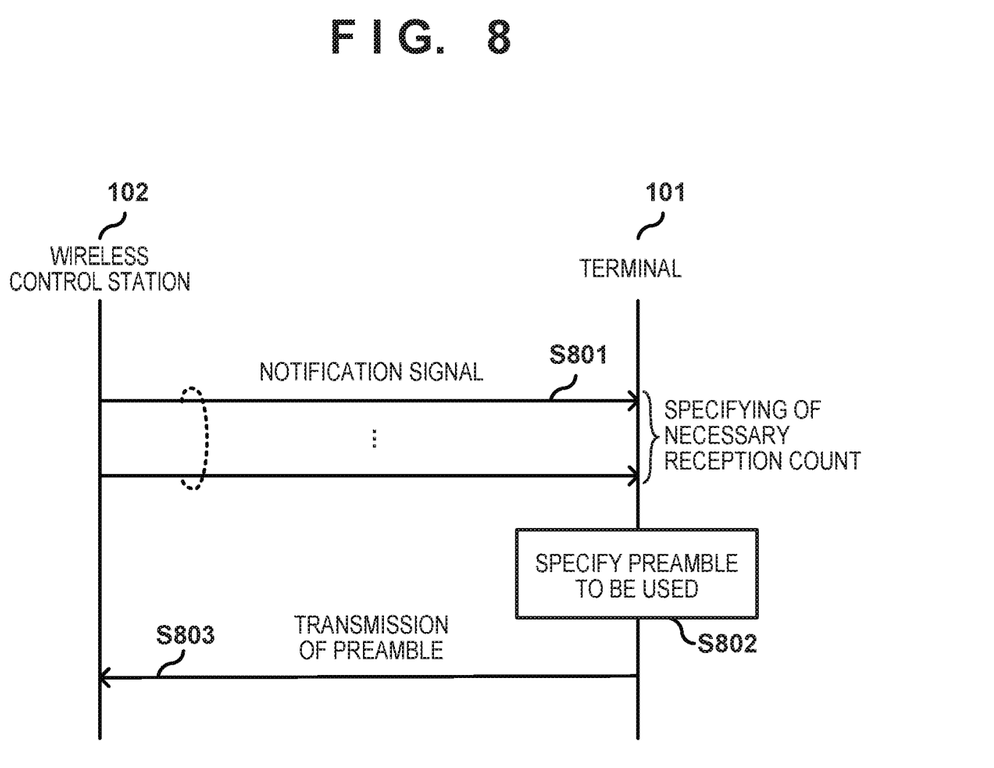
FIG. 8 is a sequence chart showing an example of the procedure of resource amount specifying processing in downlink communication.

Next, the terminal 101 specifies a preamble to be used in accordance with the reception count needed until the notification signal is successfully demodulated (step S802). Note that information for specifying the preamble to be used at this time may be informed from the wireless control station 102 to the terminal 101 by the notification signal in step S801. The terminal 101 then transmits the preamble specified in step S802 to the wireless control station 102 (step S803). At this time, the terminal 101 may transmit the preamble as many times as the repetitive transmission count in the uplink specified by, for example, the processing shown in FIG. 7, or may repeat transmission until ACK is received from the wireless control station 102. Note that the preamble transmitted at this time may be associated with the necessary reception count itself, or may be associated with the gain obtained in accordance with the specified reception count. For example, the level of the necessary gain (coverage extension level) may be divided into, for example, a predetermined number of steps. In this case, the terminal 101 can determine which one of the predetermined number of steps the reception count corresponds to. For example, if there exist four steps of 0 dB, 0 to 5 dB, 5 to 10 dB, and 10 to 20 dB as the levels of the necessary gain, the terminal 101 can determine which one of the steps the necessary reception count corresponds to, and transmit a preamble corresponding to the determination result. Accordingly, the preamble types can be limited to four types, and the number of preambles to be prepared can be suppressed.

Processing Example 3

In this processing example, the amount of a resource to be used is specified in both an uplink and a downlink. This processing will be described with reference to FIG. 9. In this processing example, first, the wireless control station 102 periodically transmits a notification signal, as in the processing example 2 (step S901). At this time, the terminal 101 also determines how many times the reception is needed until the notification signal is successfully received, or how many times the notification signal is detected until it is successfully demodulated, as in the processing example 2. After that, the terminal 101, for example, independently decides the repetitive transmission count of the preamble to the wireless control station 102 (step S902). Note that the initial value of the count may be, for example, informed from the wireless control station 102 or may be decided in accordance with the necessary reception count specified in step S901. After that, the terminal 101 specifies a preamble to be transmitted from the necessary reception count specified in step S901 and the preamble transmission count decided in step S902 (step S903), and transmits the preamble repetitively as many times as the decided transmission count (step S904). The preamble specified here corresponds to the detection count of the notification signal and the repetitive transmission count of the preamble.

Figure 10A:
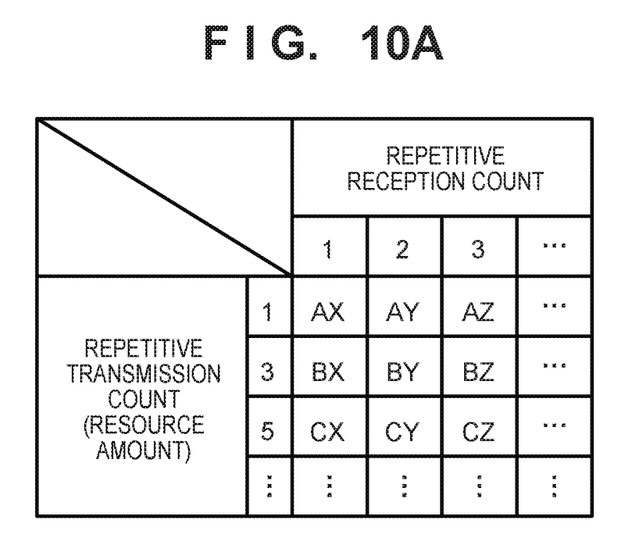
FIG. 10A is a view showing examples of preamble IDs that can be used in the resource amount specifying processing in the uplink and downlink communication.
Figure 10B:
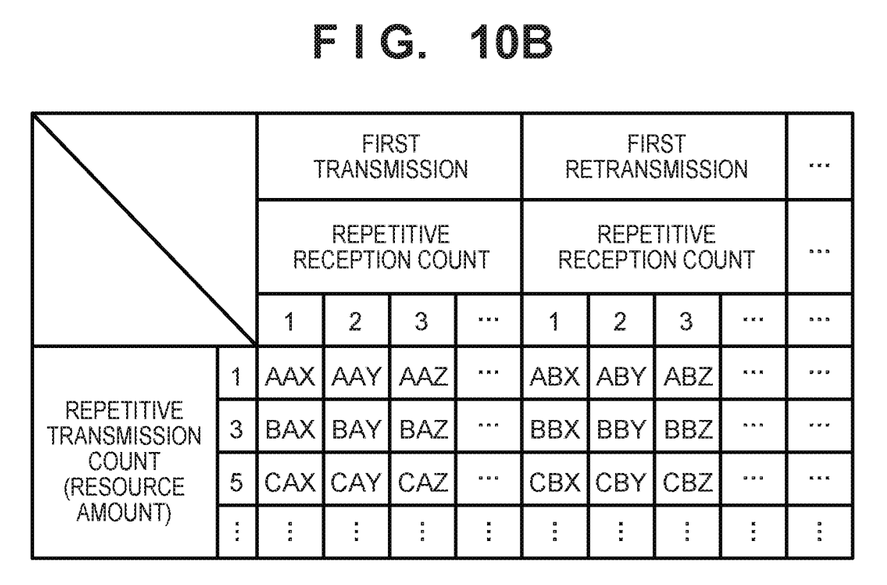
FIG. 10B is a view showing examples of preamble IDs that can be used in the resource amount specifying processing in the uplink and downlink communication.

FIG. 10A shows an example of the corresponding relationship between the preamble used at this time and the above-described transmission count and reception count. As shown in FIG. 10A, for example, if the reception count needed until the signal transmitted by the wireless control station 102 is successfully received is 1, and the preamble is not repetitively transmitted (the transmission count is 1), the terminal 101 transmits a preamble having a preamble ID: AX. Similarly, if the reception count needed until the signal transmitted by the wireless control station 102 is successfully received is 3, and the preamble is repetitively transmitted five times (the transmission count is 1), the terminal 101 transmits a preamble having a preamble ID: CZ. Note that as for the preamble, a different preamble ID may be used in each retransmission of repetitive transmission as one unit, as shown in FIGS. 6A to 6C. In this case, one preamble ID can be specified in correspondence with the repetitive transmission count, the repetitive reception count, and the retransmission count, as shown in FIG. 10B. For example, if the reception count needed until the signal is successfully received is 2, and the repetitive transmission count is 5, the terminal 101 transmits a preamble having a preamble ID: CAY in the first transmission, and transmits a preamble having a preamble ID: CBY in the first retransmission.

Figure 9:
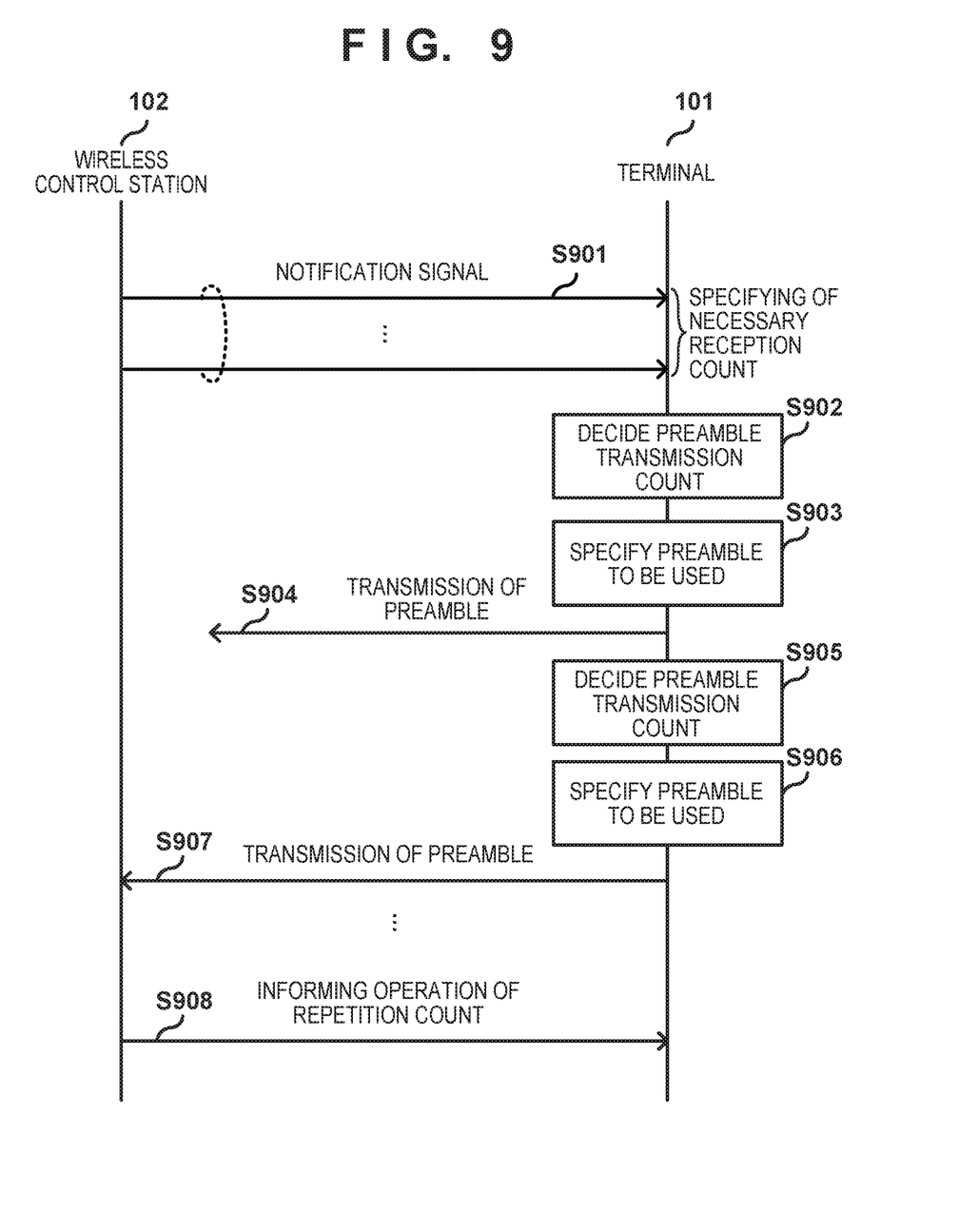
FIG. 9 is a sequence chart showing an example of the procedure of resource amount specifying processing in uplink and downlink communication.

For example, if a preamble is transmitted in step S904, but the repetitive transmission count to be used in communication is not informed from the wireless control station 102, the terminal 101 can determine that the wireless control station 102 does not succeed in receiving the preamble. In this case, the terminal 101 changes the repetitive transmission count of the preamble and attempts to transmit the preamble gain. More specifically, the terminal 101 first decides the repetitive transmission count again (step S905). At this time, the repetitive transmission count decided again is decided as a count larger than, for example, the repetitive transmission count decided in step S902. After that, since the preamble ID to be transmitted changes as the result of increasing the repetitive transmission count, the terminal 101 specifies the preamble ID after the change of the repetitive transmission count (step S906), and transmits the preamble of the specified preamble ID (step S907). After that, the terminal 101 receives the informed contents of the repetitive transmission count from the wireless control station 102 (step S908). Note that since the repetitive transmission count (the repetitive reception count for the terminal 101) to be used in the downlink direction is informed to the wireless control station 102 by the preamble in step S907, the wireless control station 102 can transmit the informed contents in step S908 repetitively as many times as the informed transmission count. The terminal 101 can know the appropriate repetitive transmission count in the uplink by the informed contents in step S908.

Note that if the corresponding relationship as shown in FIG. 10B is used, the terminal 101 transmits the preamble while changing the preamble ID in each retransmission. That is, for example, if no response (the informed contents of the repetitive transmission count) from the wireless control station 102 is received after the first transmission of the preamble of the repetition count decided in step S902, the terminal 101 increases the transmission power and retransmits the preamble. At this time, the terminal 101 performs the retransmission by a preamble having an ID different from that in the first transmission. In a case in which no informed contents from the wireless control station 102 are received even if the retransmission count reaches the retransmission count informed as, for example, the initial access parameter, the terminal 101 increase the repetitive transmission count and attempts to transmit a preamble by the initial transmission power. At this time as well, since the repetitive transmission count of the preamble changes, the preamble as the transmission target also changes. After that, the terminal 101 repeats the same processing until the response from the wireless control station 102 is received.

With the above processing, the wireless control station 102 can specify appropriate repetitive transmission counts in both the uplink and the downlink at once by specifying the preamble transmitted from the terminal 101. Note that the target to be specified at this time is not limited to the repetitive transmission count and, for example, a coverage extension level may be specified, as described in the processing examples 1 and 2. That is, the wireless control station 102 may specify the degree of coverage extension needed (or the degree of the gain required) to perform communication with the terminal 101. For example, one preamble ID may be assigned for each of coverage extension levels divided into a predetermined number of steps. In this case, for example, the terminal 101 can specify the coverage extension level without specifying the preamble transmission count, specify a preamble according to the level, and transmit the preamble repetitively as many times as the transmission count capable of obtaining the coverage extension level. Note that a method (for example, spreading) other than repetitive transmission may be used to obtain some coverage extension level.

Note that the above-described method has been described as a method of informing the coverage extension level (repetitive transmission count) by transmitting a predetermined preamble from the terminal to the wireless control station. However, the present invention is not limited to this. For example, the preamble can be a predetermined signal known between the terminal and the wireless control station, and need not always be the preamble of a random access channel. For example, when informing the corresponding relationship between the coverage extension level and the preamble ID to the terminal, the wireless control station may inform at least a part thereof, and need not always inform the whole corresponding relationship at once. As described above, the above-described embodiment is made merely for an exemplary purpose, and the present invention according to this disclosure is obviously not limited to the above-described embodiment.

The present invention is not limited to the above embodiments, and various changes and modifications can be made within the spirit and scope of the present invention. Therefore, to apprise the public of the scope of the present invention, the following claims are made.

The invention claimed is:

1. A communication apparatus that communicates with another communication apparatus, comprising a communication device and a processor coupled to a memory, wherein the processor is configured to:
   detect a signal from the other communication apparatus and specify an amount of a resource used to communicate a predetermined amount of data from the other communication apparatus to the communication apparatus; and
   transmit, to the other communication apparatus, one predetermined signal corresponding to the amount of the resource specified by the communication apparatus from a plurality of predetermined signals that are known in the communication apparatus and the other communication apparatus and respectively correspond to different amounts of a resource including at least one of a frequency and time used to communicate the predetermined amount of data,
   wherein each of the plurality of predetermined signals corresponds to a combination of the amount of the resource used to communicate the predetermined amount of data from the communication apparatus to the other communication apparatus and the amount of the resource used to communicate the predetermined amount of data from the other communication apparatus to the communication apparatus, and
   wherein the communication apparatus specifies, using a first amount of the resource, one predetermined signal corresponding to a combination of the first amount of the resource and a second amount of the resource specified by the communication apparatus from the plurality of predetermined signals, and transmits the one predetermined signal to the other communication apparatus.

2. The communication apparatus according to claim 1, wherein the communication apparatus specifies the amount of the resource used to communicate the predetermined amount of data from the other communication apparatus to the communication apparatus based on an amount of the resource needed to receive a notification signal repetitively transmitted by the other communication apparatus.

3. The communication apparatus according to claim 2, wherein the processor is further configured to acquire, by the notification signal, information representing a corresponding relationship between the amount of the resource used to communicate the predetermined amount of data and at least some of the plurality of predetermined signals.

4. The communication apparatus according to claim 1, wherein the communication apparatus specifies one predetermined signal corresponding to a combination of the first amount of the resource and the second amount of the resource specified by the communication apparatus while increasing the first amount of the resource and transmits the one predetermined signal, and
   if the signal transmitted by the communication apparatus is successfully received, the other communication apparatus specifies the combination of the amount of the resource used to communicate the predetermined amount of data from the communication apparatus to the other communication apparatus and the amount of the resource used to communicate the predetermined amount of data from the other communication apparatus to the communication apparatus, which corresponds to the signal, as the amount of the resource to be used for communication between the communication apparatus and the other communication apparatus.

5. The communication apparatus according to claim 1, wherein the amount of the resource used to communicate the predetermined amount of data from the communication apparatus to the other communication apparatus corresponds to a count of repetitive transmission of the data and transmission power used in the repetitive transmission.

6. The communication apparatus according to claim 1, wherein the amount of the resource corresponds to a count of repetitive transmission of the data.

7. The communication apparatus according to claim 1, wherein the plurality of predetermined signals are preambles of a random access channel.

8. A communication apparatus that communicates with another communication apparatus, comprising a communication device and a processor coupled to a memory, wherein the processor is configured to:
   transmit, to the other communication apparatus, information that designates a plurality of predetermined signals that are known in the communication apparatus and the other communication apparatus and respectively correspond to different amounts of a resource including at least one of a frequency and time used to communicate a predetermined amount of data;
   receive one of the plurality of predetermined signals from the other communication apparatus; and
   specify, based on the signal received by the communication apparatus, an amount of the resource to be used to communicate the data from the communication apparatus to the other communication apparatus,
   wherein each of the plurality of predetermined signals corresponds to a combination of the amount of the resource used to communicate the predetermined amount of data from the communication apparatus to the other communication apparatus and the amount of the resource used to communicate the predetermined amount of data from the other communication apparatus to the communication apparatus, and
   wherein one predetermined signal, which corresponds to a combination of a first amount of the resource and a second amount of the resource, is specified from the plurality of predetermined signals based on the first amount of the resource, and the communication apparatus receives the one predetermined signal.

9. The communication apparatus according to claim 8, wherein the communication apparatus repetitively transmits the information that designates the plurality of predetermined signals as a notification signal.

10. The communication apparatus according to claim 8, wherein the plurality of predetermined signals are preambles of a random access channel.

11. A method of controlling a communication apparatus that communicates with another communication apparatus, comprising:
   detecting a signal from the other communication apparatus and specifying an amount of a resource used to communicate a predetermined amount of data from the other communication apparatus to the communication apparatus; and
   transmitting, to the other communication apparatus, one predetermined signal corresponding to the amount of the specified resource from a plurality of predetermined signals that are known in the communication apparatus and the other communication apparatus and respectively correspond to different amounts of a resource including at least one of a frequency and time used to communicate the predetermined amount of data,
   wherein each of the plurality of predetermined signals corresponds to a combination of the amount of the resource used to communicate the predetermined amount of data from the communication apparatus to the other communication apparatus and the amount of the resource used to communicate the predetermined amount of data from the other communication apparatus to the communication apparatus, and
   wherein the communication apparatus specifies, using a first amount of the resource, one predetermined signal corresponding to a combination of the first amount of the resource and a second amount of the resource specified by the communication apparatus from the plurality of predetermined signals, and transmits the one predetermined signal to the other communication apparatus.

12. A method of controlling a communication apparatus that communicates with another communication apparatus, comprising:
   transmitting, to the other communication apparatus, information that designates a plurality of predetermined signals that are known in the communication apparatus and the other communication apparatus and respectively correspond to different amounts of a resource including at least one of a frequency and time used to communicate a predetermined amount of data;
   receiving one of the plurality of predetermined signals from the other communication apparatus; and
   specifying, based on the received signal, an amount of the resource to be used to communicate the data from the communication apparatus to the other communication apparatus,
   wherein each of the plurality of predetermined signals corresponds to a combination of the amount of the resource used to communicate the predetermined amount of data from the communication apparatus to the other communication apparatus and the amount of the resource used to communicate the predetermined amount of data from the other communication apparatus to the communication apparatus, and
   wherein one predetermined signal, which corresponds to a combination of a first amount of the resource and a second amount of the resource, is specified from the plurality of predetermined signals based on the first amount of the resource, and the communication apparatus receives the one predetermined signal.

13. A non-transitory computer-readable storage medium for storing a computer program that causes a computer provided in a communication apparatus that communicates with another communication apparatus to:
   detect a signal from the other communication apparatus and specify an amount of a resource used to communicate a predetermined amount of data from the other communication apparatus to the communication apparatus; and
   transmit, to the other communication apparatus, one predetermined signal corresponding to the amount of the specified resource from a plurality of predetermined signals that are known in the communication apparatus and the other communication apparatus and respectively correspond to different amounts of a resource including at least one of a frequency and time used to communicate the predetermined amount of data,
   wherein each of the plurality of predetermined signals corresponds to a combination of the amount of the resource used to communicate the predetermined amount of data from the communication apparatus to the other communication apparatus and the amount of the resource used to communicate the predetermined amount of data from the other communication apparatus to the communication apparatus, and
   wherein the communication apparatus specifies, using a first amount of the resource, one predetermined signal corresponding to a combination of the first amount of the resource and a second amount of the resource specified by the communication apparatus from the plurality of predetermined signals, and transmits the one predetermined signal to the other communication apparatus.

14. A non-transitory computer-readable storage medium for storing a computer program that causes a computer provided in a communication apparatus that communicates with another communication apparatus to:
   transmit, to the other communication apparatus, information that designates a plurality of predetermined signals that are known in the communication apparatus and the other communication apparatus and respectively correspond to different amounts of a resource including at least one of a frequency and time used to communicate a predetermined amount of data;
   receive one of the plurality of predetermined signals from the other communication apparatus; and
   specify, based on the received signal, an amount of the resource to be used to communicate the data from the communication apparatus to the other communication apparatus,
   wherein each of the plurality of predetermined signals corresponds to a combination of the amount of the resource used to communicate the predetermined amount of data from the communication apparatus to the other communication apparatus and the amount of the resource used to communicate the predetermined amount of data from the other communication apparatus to the communication apparatus, and
   wherein one predetermined signal, which corresponds to a combination of a first amount of the resource and a second amount of the resource, is specified from the plurality of predetermined signals based on the first amount of the resource, and the communication apparatus receives the one predetermined signal.

* * * * *